March 25, 1952 W. S. TANDLER ET AL 2,590,736
DEVICE FOR DISPENSING BOOKS, PACKAGES AND THE LIKE
Filed June 12, 1946 14 Sheets-Sheet 1

INVENTORS
WILLIAM S. TANDLER
DAVID S. WALKER
BY FERDINAND A. DeWEISS
Campbell, Brumbaugh & Free
their ATTORNEYS March 25, 1952     W. S. TANDLER ET AL     2,590,736
DEVICE FOR DISPENSING BOOKS, PACKAGES AND THE LIKE
Filed June 12, 1946     14 Sheets-Sheet 2

INVENTORS
WILLIAM S. TANDLER
DAVID S. WALKER
BY FERDINAND A. DeWEISS
Campbell, Brumbaugh & Free
their ATTORNEYS March 25, 1952  W. S. TANDLER ET AL  2,590,736
DEVICE FOR DISPENSING BOOKS, PACKAGES AND THE LIKE
Filed June 12, 1946  14 Sheets-Sheet 3

INVENTORS
WILLIAM S. TANDLER
DAVID S. WALKER
BY FERDINAND A. DeWEISS
Campbell, Brumbaugh+Free
the ATTORNEYS

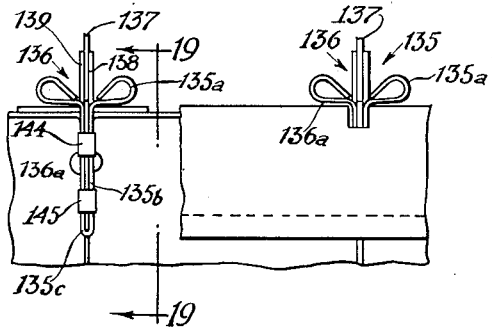
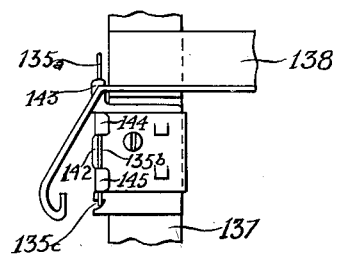
Fig. 18.  Fig. 19.
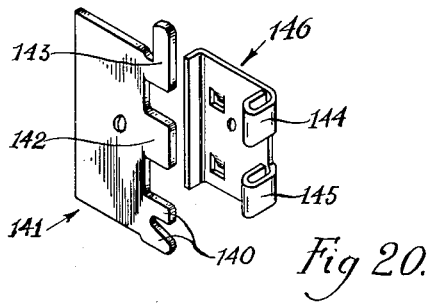
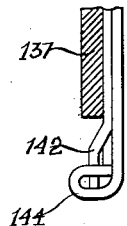
Fig 20.  Fig 21.
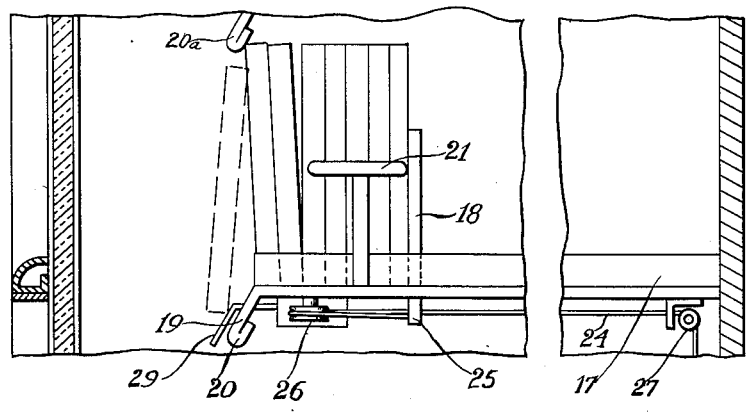
Fig. 4.
INVENTORS
WILLIAM S. TANDLER
DAVID S. WALKER
BY FERDINAND A. DE WEISS
their ATTORNEYS

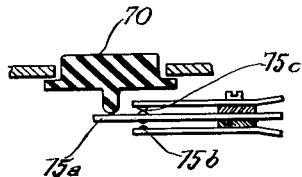
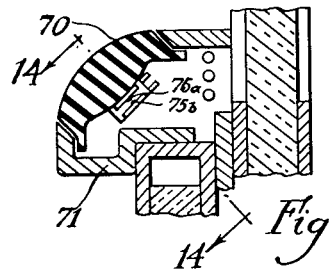
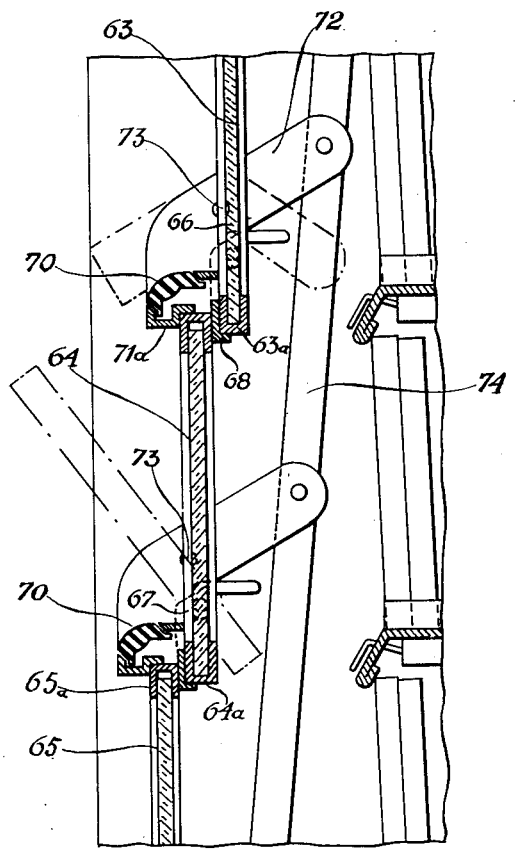
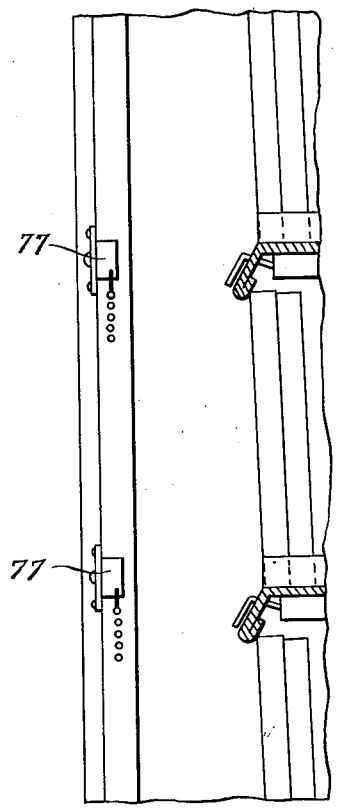

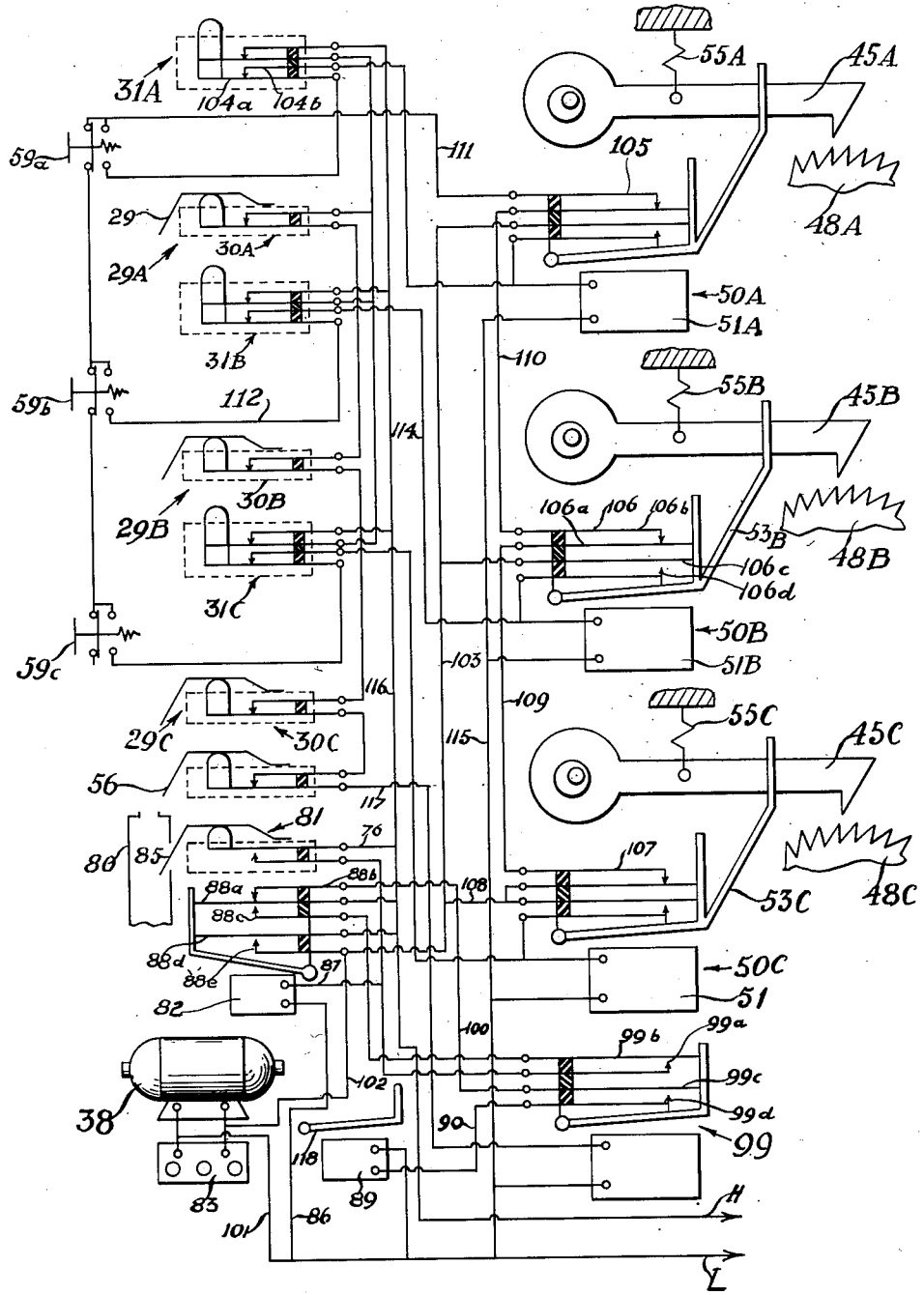

March 25, 1952 W. S. TANDLER ET AL 2,590,736
DEVICE FOR DISPENSING BOOKS, PACKAGES AND THE LIKE
Filed June 12, 1946 14 Sheets-Sheet 11
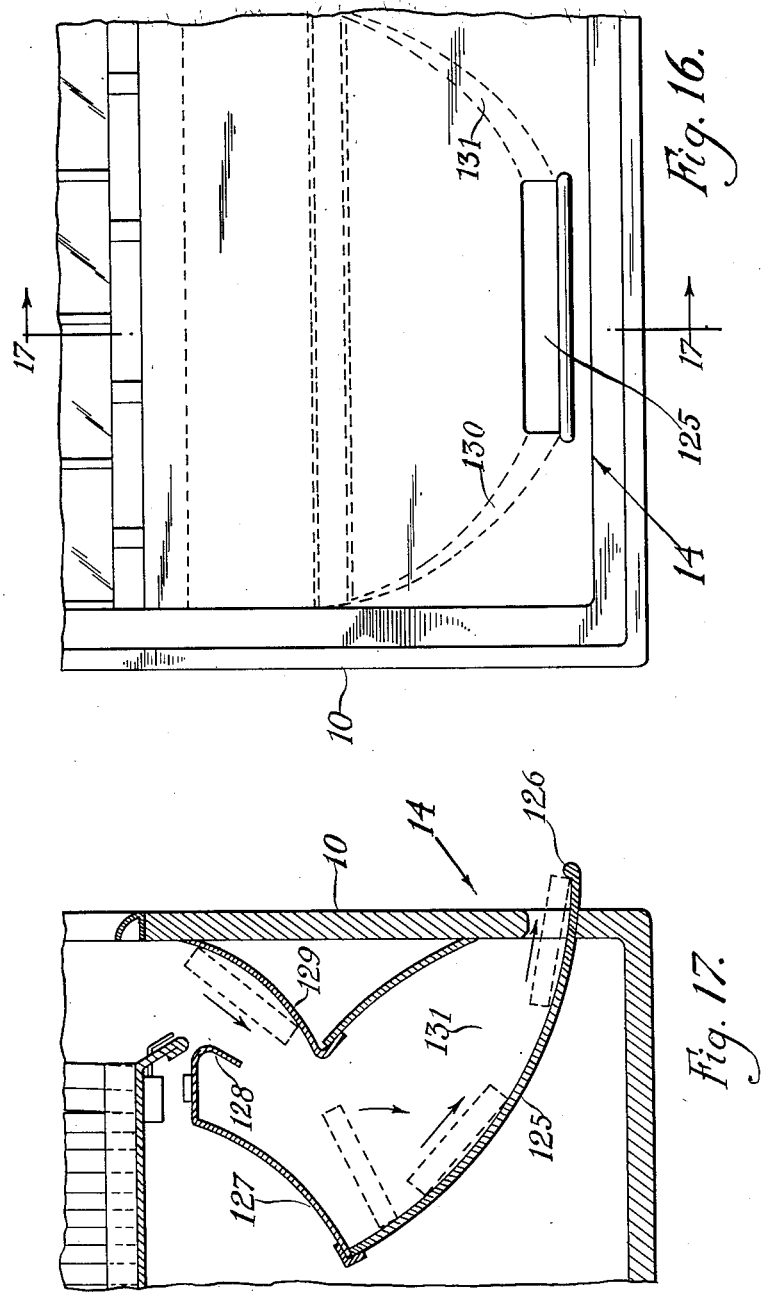
INVENTORS
WILLIAM S. TANDLER
DAVID S. WALKER
BY FERDINAND A. DeWEISS
Campbell, Brumbaugh+Free
Their ATTORNEYS March 25, 1952 W. S. TANDLER ET AL 2,590,736
DEVICE FOR DISPENSING BOOKS, PACKAGES AND THE LIKE
Filed June 12, 1946 14 Sheets-Sheet 12

INVENTORS
WILLIAM S. TANDLER
DAVID S. WALKER
FERDINAND A. DE WEISS
BY
Campbell, Brumbaugh & Free
Their ATTORNEYS.

March 25, 1952 W. S. TANDLER ET AL 2,590,736
DEVICE FOR DISPENSING BOOKS, PACKAGES AND THE LIKE
Filed June 12, 1946 14 Sheets-Sheet 13

INVENTORS
WILLIAM S. TANDLER
DAVID S. WALKER
BY FERDINAND A. DeWEISS
Campbell, Brumbaugh & Free
their ATTORNEYS.

March 25, 1952  W. S. TANDLER ET AL  2,590,736
DEVICE FOR DISPENSING BOOKS, PACKAGES AND THE LIKE
Filed June 12, 1946  14 Sheets-Sheet 14

*Fig. 27.*

INVENTORS
WILLIAM S. TANDLER
DAVID S. WALKER
BY FERDINAND A. DEWEISS
Campbell, Brumbaugh & Free
their ATTORNEYS Patented Mar. 25, 1952

2,590,736

UNITED STATES PATENT OFFICE 2,590,736

DEVICE FOR DISPENSING BOOKS, PACKAGES, AND THE LIKE

William S. Tandler, David S. Walker, and Ferdinand A. de Weiss, New York, N. Y., assignors to Vendomatic Machine Corporation, New York, N. Y., a corporation of Delaware Application June 12, 1946, Serial No. 676,226

6 Claims. (Cl. 194—10)

This invention relates to devices which are particularly suitable for dispensing books, packages, cartons and the like of varying shape and size. This invention is an improvement over the dispensing devices disclosed in our copending applications Serial No. 572,220, filed January 10, 1945, now Patent No. 2,500,437 issued March 14, 1950 and Serial No. 615,160, filed September 8, 1945, now Patent No. 2,500,438 issued March 14, 1950.

Devices of the type generally disclosed in the above identified applications are useful for dispensing a wide variety of articles which vary in thickness, such as, for example, books, boxes of candy and many other articles. Thus, for example, the dispensing devices described in the copending applications can dispense both thick and then packages or articles for the reason that the operation of the dispensing device is controlled by the article that is dispensed.

Such dispensing devices must be made relatively "foolproof" and must be arranged so that a purchaser of one of the articles cannot cause improper operation of the device to dispense more than the number of articles for which he has paid. Moreover, the device must be so arranged that the articles cannot be shaken or otherwise taken from the device without payment.

Also, the mechanism must be arranged so that it cannot jam and discharge a whole row of the articles upon initiation of the operation of the device.

Further, the mechanism for operating the device should be arranged conveniently and so disposed that individuals desiring to make purchases can operate the device easily without danger of damaging the mechanism of the device.

An object of the present invention is to provide mechanism whereby the features noted above may be attained.

Another object of the invention is to provide a simplified form of mechanism which will dispense or vend only the article selected by the customer.

Another object of the invention is to provide mechanism whereby improper manipulation of the control elements will not cause jamming of the machine or the dispensing of more than the number of articles paid for.

Another object of the invention is to provide a vending device from which the articles cannot be dislodged by shaking the machine.

A further object of the invention is to provide a device wherein the control elements are located more conveniently and are readily visible and closely related to the article selected by the customer.

A further object of the invention is to provide a dispensing mechanism which can be refilled readily.

Other objects of the invention will become apparent from the following description of typical forms of devices embodying the present invention.

In accordance with the present invention, we have provided article-dispensing devices which are capable of receiving a plurality of rows of articles which are arranged at random in the rows. These rows of articles can be advanced to discharge the front article in the row.

In order to accomplish this result, we have provided a control mechanism, the operation of which can be initiated by the insertion of a coin or coins and the operation of a suitable selector button or switch and in which the operation of the device is discontinued by discharging the selected article into a dispensing chute.

The articles are retained in their respective rows by resilient elements which engage suitable portions of the articles to retain them against dislodgement, as, for example, by shaking the machine. These flexible elements, however, permit the rows of articles to be advanced and individual articles to be dislodged to drop into the dispensing chute.

The dispensing chute in this improved form of device is so arranged that access to the articles in the rows cannot be gained through the chute. Also, the chute may be provided with a control member for shutting off the operation of the device if, for example, one of the control switches that is operated by the falling article should jam and permit continued operation of the device.

The new device also includes an improved mechanism whereby, upon simultaneous operation of the control buttons or switches which initiate the dispensing operation, only one of the switches is effective to set the device into operation to dispense one, and only one, article.

The device includes other features for rendering the operation of the device more foolproof and efficient.

A better understanding of the novel features of the device will be gained by reference to the accompanying drawings in which:

Figure 4 is a view in section illustrating one of the article supporting troughs;

Figure 10 is a view in vertical section of a portion of the front panel taken on line 10—10 of Figure 9;

Figure 11 is a view in cross section taken through one of the switch control buttons of the device disclosed in Figure 10;

Figure 13 is a view in vertical section taken on line 13—13 of Figure 12;

Figure 14 is a view in section taken on line 14—14 of Figure 11;

Figure 15 is a diagrammatic showing of the circuit of the selector mechanism;

Figure 16 is a view in front elevation of the lower portion of the vending machine disclosing a modified form of dispensing chute;

Figure 17 is a view in section taken on line 17—17 of Figure 16;

Figure 18 is a view in front elevation of the device for retaining the packages in their respective rows against accidental dislodgement;

Figure 19 is a view in section taken on line 19—19 of Figure 18;

Figure 20 is an exploded view of the retaining elements for the resilient holding fingers;

Figure 21 is a top plan view of the retaining elements with the support therefor shown in section;

Figure 27 is a diagrammatic view of a modified form of coin-controlled switch for the electrical circuit of the device.

Figure 1:
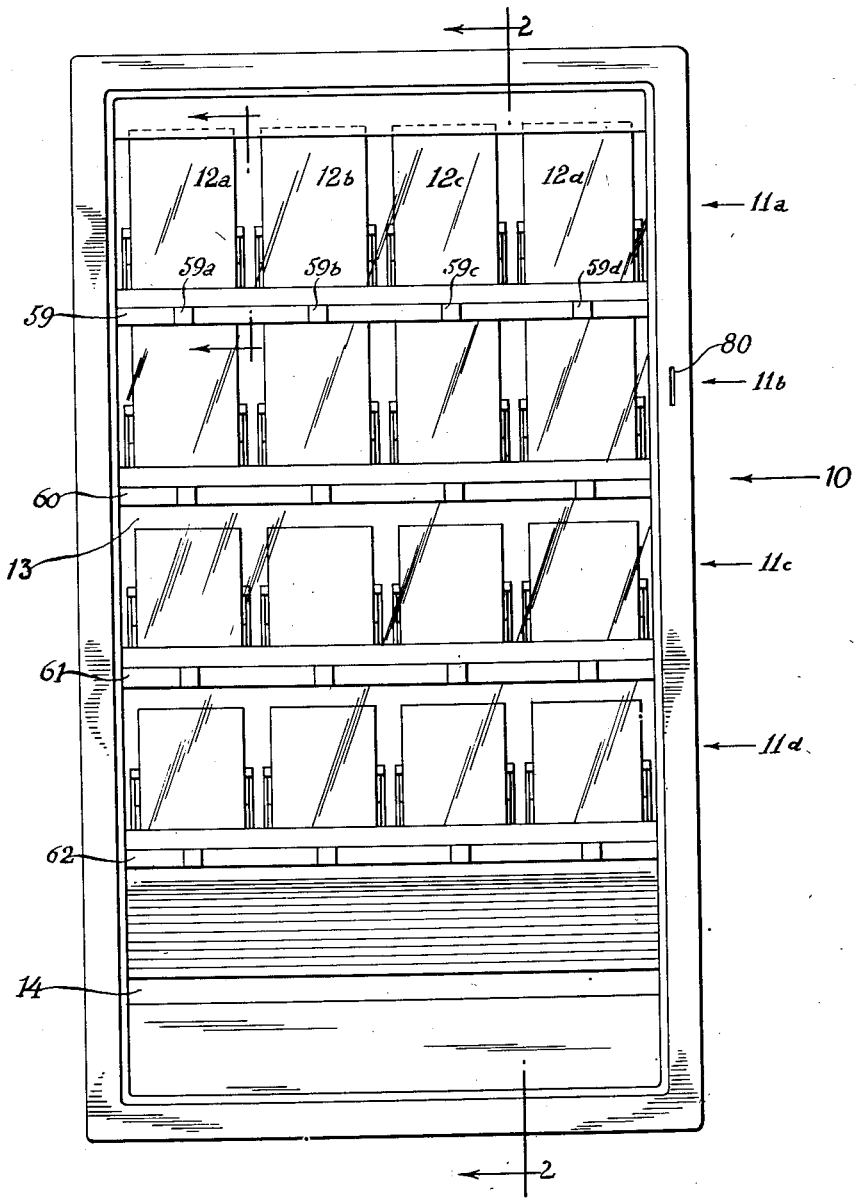
Figure 1 is a view in front elevation of a typical form of device for dispensing books and the like embodying the present invention.
Figure 2:
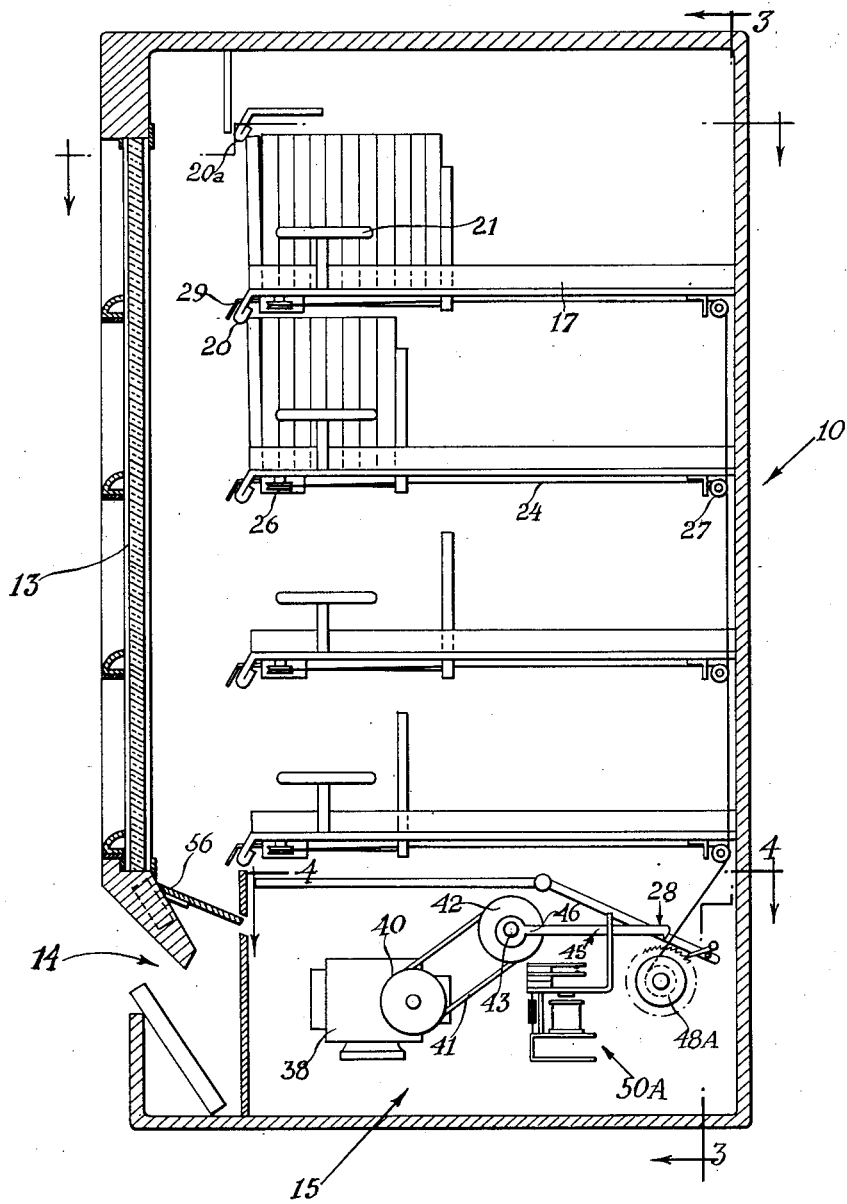
Figure 2 is a view in section taken on line 2—2 of Figure 1.

The form of the invention chosen for purposes of illustration may suitably consist of a dispensing machine for books, packages and the like having a generally rectangular casing 10 or a casing of any other desired shape in which is mounted the mechanism, to be described, for dispensing the articles from a plurality of rows of articles. As shown in Figures 1 and 2, a typical dispensing device may have four horizontal rows 11a, 11b, 11c, and 11d, each row containing four columns of articles 12a, 12b, 12c, and 12d. The number of articles in each of the rows 12a to 12d may vary and the thickness of the articles also may vary, as, for example, in the case of pocket novels which may vary in thickness from one-quarter inch to as much as one-and-a-quarter inches in thickness.

The casing 10 of the device is provided with a transparent front panel 13 through which the front article in each of the rows is visible.

In the lower front portion of the casing 10 is the discharge or dispensing chute 14 into which the article is dropped so that it can be removed by the customer. Behind the chute 14 is an enclosed portion of the casing 15 in which the operating mechanism for advancing the columns of articles is contained.

Figure 5:
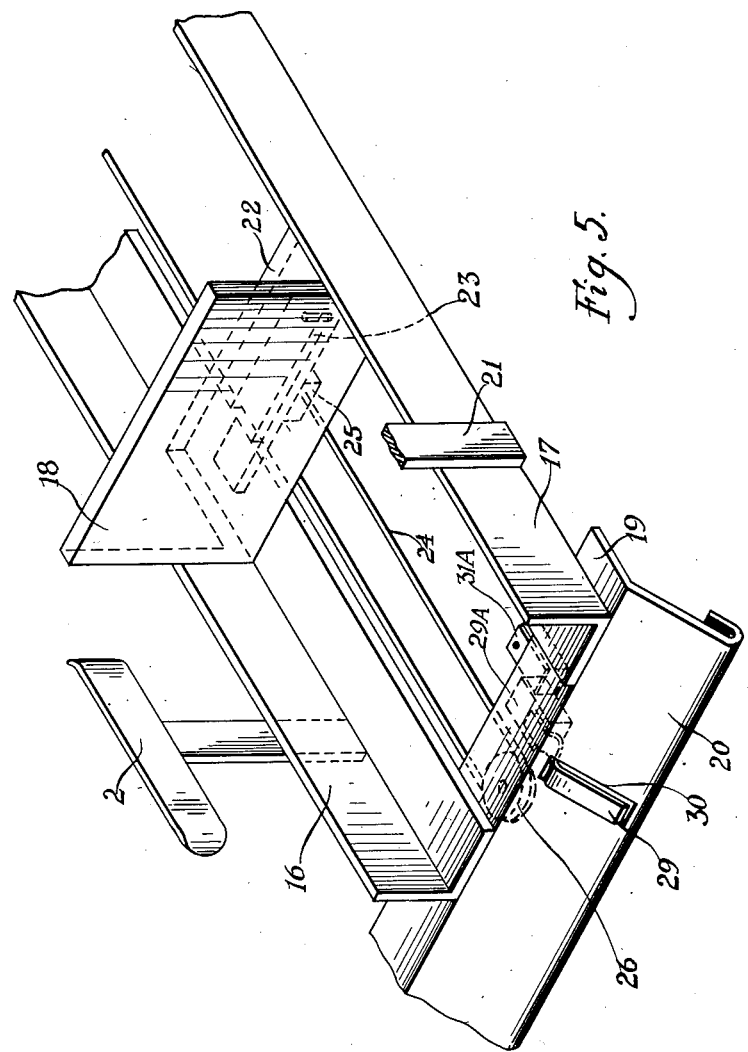
Figure 5 is a perspective view of a detail of the device disclosing the troughs, the pushing member for feeding the articles, and the shutoff switch for the device.
Figure 6:
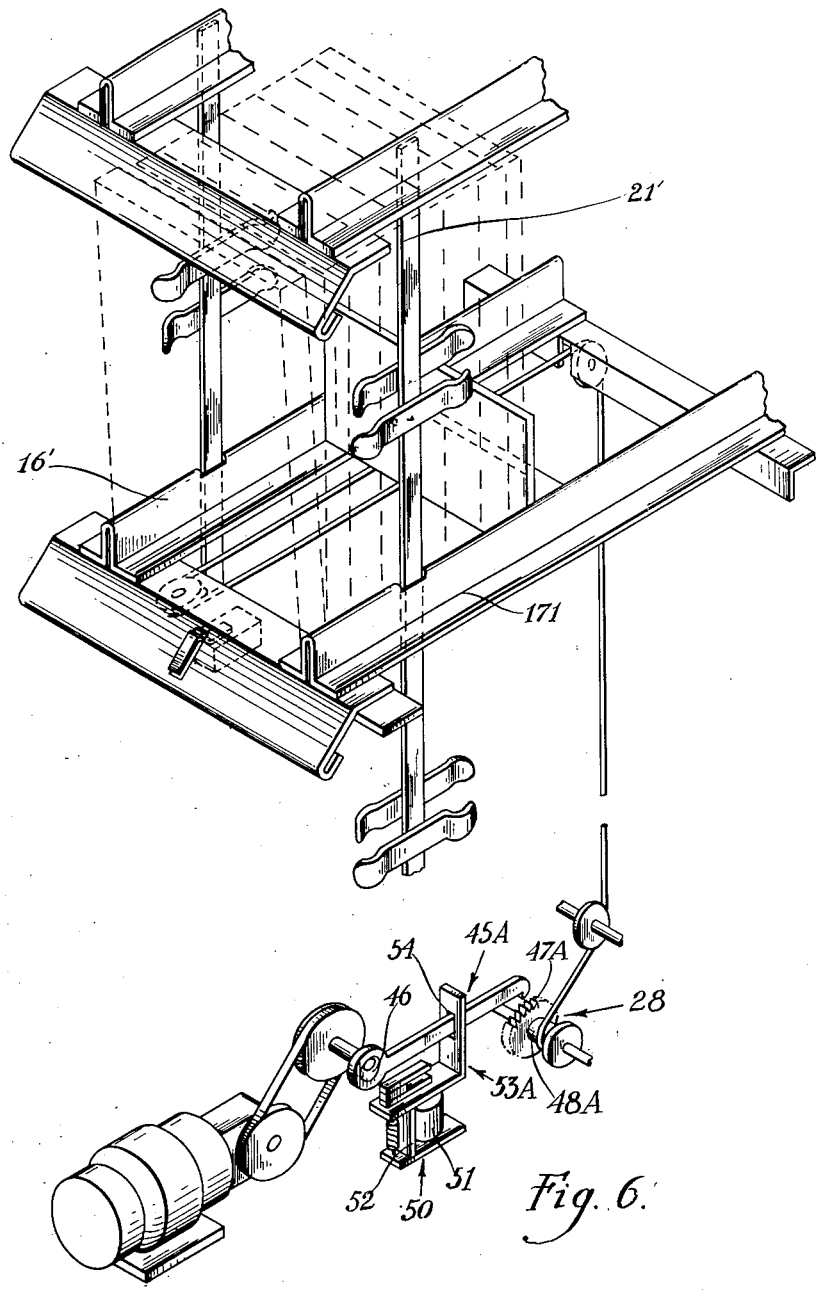
Figure 6 is a perspective view of a modified form of the machine disclosing two superimposed troughs and the mechanism for operating the pusher or follower member.

Each of the columns of articles, for example, the row or column 12a is supported by a pair of angle irons 16 and 17, best shown in Figures 4, 5, and 6, which engage the lower corners of the articles. A follower member 18 is mounted between the angle irons 16 and 17 and its lower corners rest in the angles formed by the angle members 16 and 17. The forward edges of the angle members 16 and 17 may be connected by means of a cross plate 19 having a downwardly and forwardly projecting flange 20 which is of sufficient length to engage the upper edge of the leading article in the next lower column. The uppermost column is engaged by a similar cross and flange member 20a which prevents the books or other articles from tipping forward and falling into the delivery chute 14. In order to hold the articles substantially vertically, each of the channel members 16 and 17 may be provided with a resilient T-shaped member 21 which engages the edges of the leading articles in the column and resists their forward movement as they are urged forwardly by the pusher member 18.

The pusher member 18 has a rearwardly projecting flange 22 thereon which rests on the horizontal portions of the angle members 16 and 17 and a block 23 therebeneath which engages under the horizontal flange of the angle members 16 and 17 to prevent the pusher member from tilting.

Figure 3:
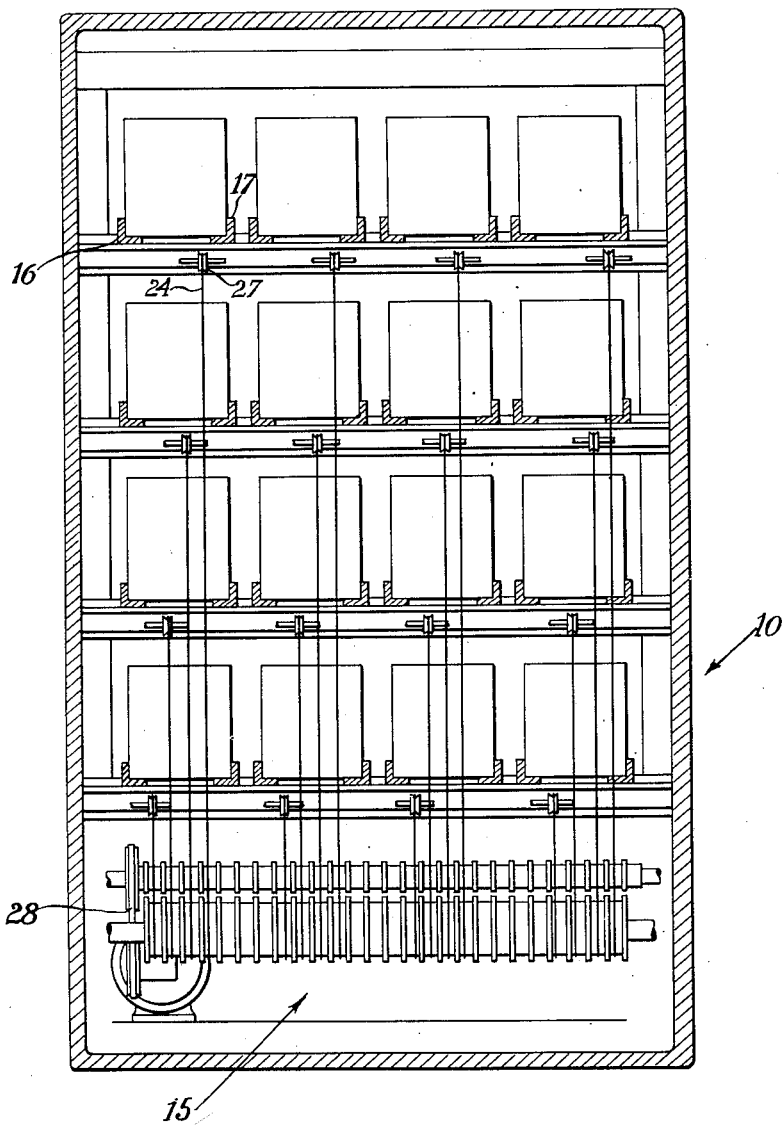
Figure 3 is a view in section taken on line 3—3 of Figure 2.

Each of the pusher members 18 is moved forwardly by means of a cable 24 (Figures 2 and 3) which engages a downwardly projecting fitting 25 on the lowermost block 23, passes forwardly around a pulley 26, then rearwardly over a pulley 27, and downwardly to a reel or drum mechanism 28 to be described hereinafter.

Each of the downwardly and forwardly projecting plates 20 may be provided with a movable tongue member 29 (Figures 4 and 5) which extends through a slot 30 in the plate 20 and, upon being pressed downwardly, operates a switch 29A to stop the forward movement of the follower or pusher 18. A limit switch 31A (Figure 5) is also provided for limiting the forward movement of the pusher 18.

The above described construction is susceptible to some modification, for example, as shown in Figure 6, the cross-shaped members 21' corresponding to the T-shaped retaining elements 21 may extend between the T-shaped guide members 16' and 17' as shown in Figure 6. In this form of device, the cross-shaped retaining members 21' are disposed to engage the upper portions of the lateral edges of the articles but are supported from the angle members 16' and 17' above each of the troughs.

Figure 7:
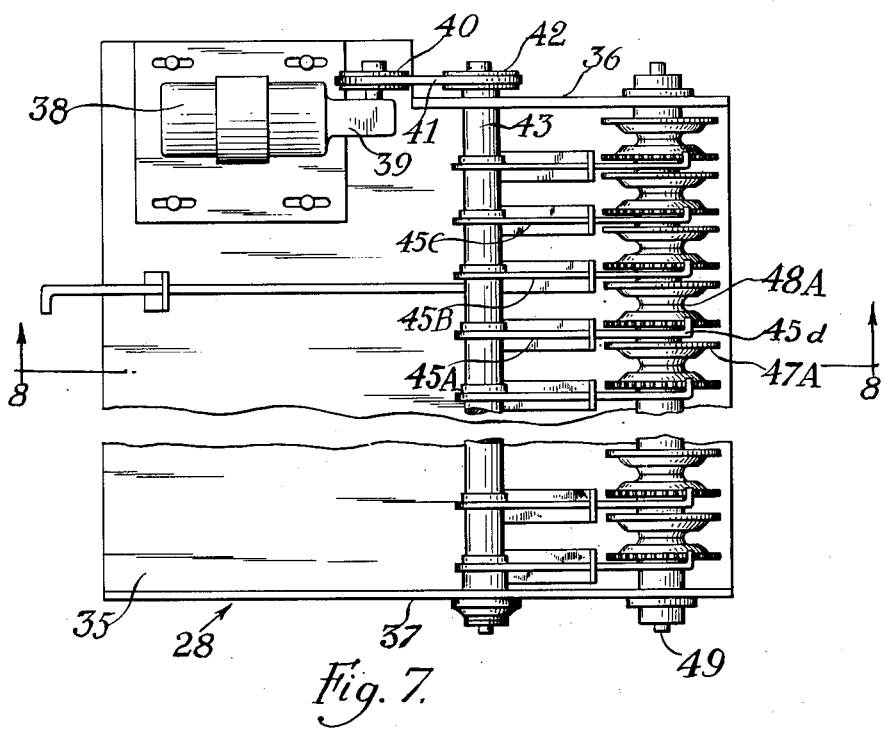
Figure 7 is a top plan view of the driving mechanism for the device.
Figure 8:
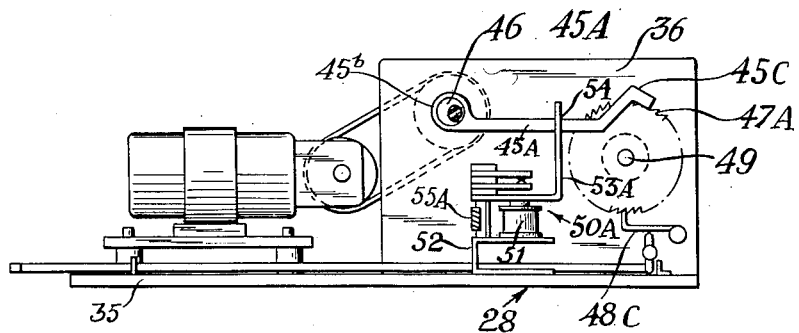
Figure 8 is a view in section taken on line 8—8 of Figure 7.

The various followers described above are advanced by means of the reel or drum mechanism 28 referred to above. This mechanism is best shown in Figures 7 and 8. The mechanism includes a generally U-shaped base plate member 35 having upwardly extending side flanges 36 and 37. An electric motor 38 is mounted in the left hand corner of the frame member 35 and is provided with reduction gearing 39 for driving a pulley 40. The pulley 40 is connected by means of a belt 41 to a pulley 42 which is fixed to the end of a cam shaft 43. The cam shaft 43 drives a plurality of pawl members 45, each corresponding to one of the follower members 18. The device illustrated has sixteen pawl members 45A, 45B, 45C, etc. Each of the pawl members is mounted on a different eccentric or cam 46 so that as the shaft 43 is rotated, the pawl members 45A etc. are gyrated and moved back and forth.

The pawl member 45A (Figure 8) which is typical of these members has a generally horizontally extending straight arm portion 45a which projects from an annular eccentric strap portion 45b that receives the eccentric 46. The arm 45a has at its opposite end an upwardly projecting portion 45c which terminates in an angular flange 45d forming the pawl tooth. The pawl 45A cooperates with a ratchet tooth rim 47A on a spool or reel 48A which is rotatably mounted on a shaft 49 which extends between the side plates 36 and 37. All of the reels, sixteen in number in this case, are independently rotatable. A stop pawl 48c may be associated with each of the spools or reels to prevent reverse rotation of the reels.

The cables which extend from each of the follower members corresponding to the member 18 are secured to different reels or drums so that as each reel is rotated, its corresponding follower will be advanced.

In the normal operation of the device, the motor will be set into operation when a coin is inserted in the coin-controlled member, later to be described generally. This causes the shaft 43 to rotate, and all of the pawls 45A, etc. are set into operation. However, inasmuch as only one of the pawls is to be rendered operative to advance one column of articles, a mechanism must be provided for retaining all of the other pawls out of engagement with the ratchet teeth on their respective reels. As shown best in Figure 8, each of the pawls 45A, 45B, 45C, etc. is provided with a corresponding control mechanism. The solenoid control mechanism for the pawl 45A may consist of a relay 50A including a coil 51 which is supported on a bracket 52 on the member 35. Cooperating with the coil 51 is an angle iron armature 53A having an upwardly extending slotted end 54 in which the arm 45a of the pawl 45A is received. The arm 54 is normally urged upwardly by means of a spring 55A to retain the pawl 45A out of engagement with the ratchet teeth 47. However, when the coil 51 is energized, the angle member 54 is pulled downwardly and the pawl tooth 45d is lowered into a position to engage the ratchet teeth 47A, thereby causing the spool 48A to rotate in response to rotation of the cam shaft 43.

Inasmuch as each of the followers 18 is controlled by a similar relay device 50A, 50B, 50C, etc. (Figures 8 and 15), selective operation of manually operated switch buttons on the front of the casing 10 will permit any selected column of articles to be advanced sufficiently to discharge the front element from its column. As the article is dislodged, it slides over the inclined plate 20 and strikes the switch control member 29 which, as will be described presently, deenergizes the relay 50A, etc. corresponding to the pawl 45A, 45B, 45C, etc. that is in operating position. The article then falls downwardly into the discharge chute 14 and may be removed by the customer. As a supplement to the control of the motor 38 and to assure the stopping of the motor 38 upon discharge of each article, a separate deflector plate and switch control member 56 may be mounted on the front panel above the discharge chute 14 (Figure 2) or in any other place where it will be deflected by a falling package. This plate 56 being in the path of any of the articles falling from the various troughs will be deflected downwardly to shut off the motor 38 and stop the operation of the device. In some instances, the deflector plate 56 may in itself be sufficient to assure the proper stoppage of the dispensing operation, and the switch control members 29 may be eliminated completely.

The mechanism for selecting the article to be dispensed may consist of a series of switch buttons which are disposed in front of each of the columns of articles, preferably on the front panel 13 of the device. As shown in Figure 1, the panel 13 has cross rails 59, 60, 61, and 62 corresponding to each of the horizontal columns 11a, 11b, 11c, and 11d, respectively. The cross rail 59, for example, may be provided with four switch buttons 59a, 59b, 59c, and 59d, these buttons corresponding, respectively, to the columns 12a to 12d. These switch buttons are connected in such relationship, as will be described in greater detail hereinafter, that upon insertion of a coin or combination of coins, and depressing of a selected one of these buttons, a book or other article in the column immediately adjacent to and above the button will be dispensed.

Figure 9:
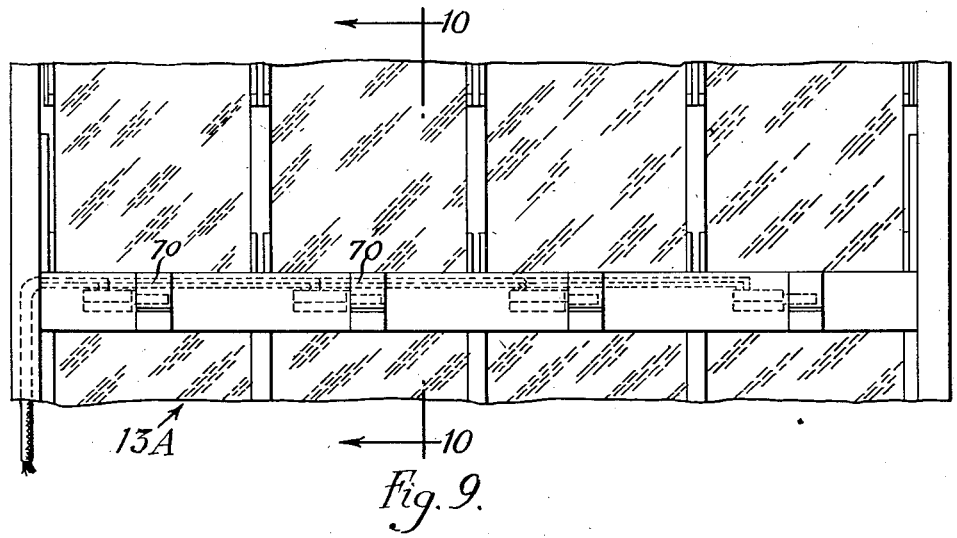
Figure 9 is a view in front elevation of one section of a modified form of front panel.

The arrangement of the switch buttons 59a to 59d, etc., as well as the front panel of the device, is susceptible to considerable modification. For example, as shown in Figures 9 to 11, the front panel 13A of the modification disclosed therein, may consist of a plurality of glass sashes 63, 64, 65, etc., each of which is pivotally supported on suitable pivot arms 66, 67 so that it can be swung to the dotted line position shown in Figure 10, or into the position shown in full lines whereby the upper edge of the panel 64 engages the lower edge of the panel or sash 63. The glass panels may be mounted in suitable metallic sash frames 63a, 64a, 65a, etc., for example, which are provided with angle members 68 for engaging the frame of the next adjacent panel above.

In this form of device, the switch buttons 70 are mounted in a hollow quarter round member 71 which extends transversely of the front panel 13A and is supported at its opposite ends by bell crank levers 72, only one of which is shown at the end of each of the bars 71. The bell crank levers 72 are supported on the pivots 73 and have their inner ends connected to rockable levers 74 so that upon downward movement of the levers 74, the cross bar 71 can be swung to the dotted line position. In so moving, the L-shaped flange 71a on the bar 71, disengages the sash 64, for example, and allows it to pivot to the dotted line position to permit access to the interior of the cabinet.

The switch button 70 is arranged to close the two contacts 75a and 75b of a switch member and open the circuit through the contact 75c.

Figure 12:
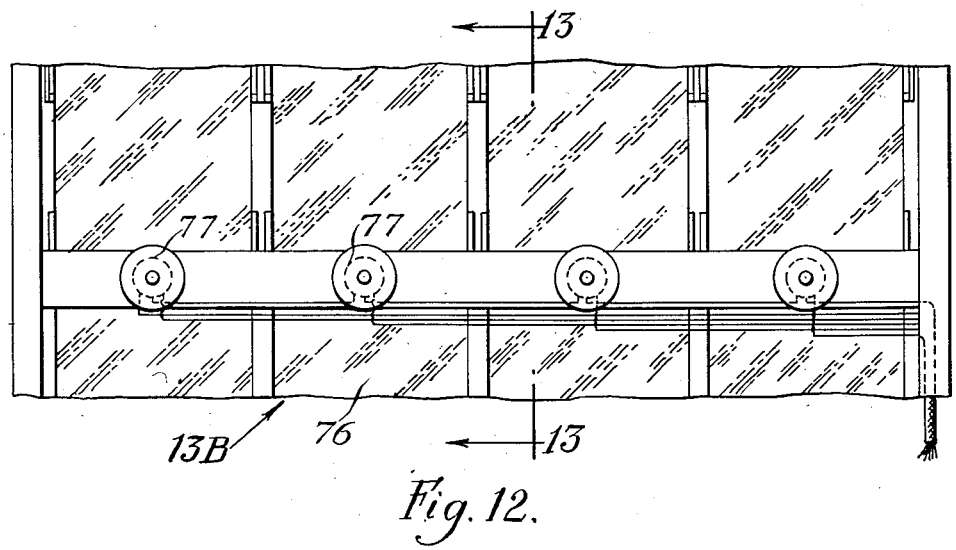
Figure 12 is a view in front elevation of a portion of another modified form of front panel.

The front panel may be modified further as disclosed in Figures 12 and 13. In this case, the front panel 13B consists of a sheet 76 of transparent plastic in which push button switches 77 are mounted. The switches 77 may be of the double-throw type like the switch shown in Figure 14. The connecting wires for the switches 77 may be molded directly in the transparent panel 76.

The operation of the device is as follows:

Assume that the delivery of a package from a specific tray is required. A coin is deposited in a coin slot leading to a slug detector and ejector of conventional type and not shown herein. The coin passes into a chute 80 and closes the coin switch 81. The coin switch completes the circuit of the start relay 82, starting the motor 38 and energizing the counter magnet 83. The motor then starts the reciprocating motion of the pawls 45A, 45B, 45C, etc., but due to the action of the spring, the pawls do not contact their respective ratchets. A select button, for example button 59a, is then pressed, energizing its select relay 50A. The armature 53A of the select relay forces the pawl 45A into contact with ratchet on the spool 48A, and the armature closes a contact on the select relay thereby keeping the relay energized, and opens another contact on the select relay thereby preventing any other selection from being made. The rotation of the ratchet wheel results in the delivery of a package by means of the action of the corresponding pusher 18. As the package falls into the delivery passage, it strikes the actuator lip 29 of the corresponding stop switch 29A, thereby deenergizing a return relay to be described. The contacts on the return relay open as the return relay is deenergized, and thereby deenergizes the start relay and consequently the motor, counter and select relays. This action brings the mechanism to its starting position.

The electrical circuit for the device is disclosed more particularly in Figure 15 and operates as follows:

The coin in its passage through chute 80 acts on the lever 85 of the coin switch 81, momentarily closing this switch, thereby energizing the start relay 82 from power line L, through lead 86, solenoid 82, lead 87, the switch 81, the lead 76, and to power line H. When the relay 82 closes, switch arm 88a is disengaged from the contact 88b which had been used to energize the coin return solenoid 89 (i. e., from power line L, solenoid 89, lead 90, closed contacts 99c and 99d of return relay 99, lead 100, contact 88b, switch arm 88a, and power line H, which in its energized position allowed the coin to pass through the coin chute) and makes contact with contact 88c completing the closed circuit of switch contacts 88a, 88c, switch contacts 99a, 99b, and start relay coil 82 to line L and H, thereby keeping the start relay energized independently of any further action of coin switch 81.

The second set of switch contacts 88d and 88e of the start relay 82 is used to complete the circuit for the motor and counter through the lead 101 and lead 102 to lines L and H, and to connect line 103 to the power line H thereby allowing a selector switch 59a, 59b, 59c, etc. When depressed to energize its select relay 50A, 50B, 50C, etc.

As previously mentioned, the pawl will begin its reciprocating action as soon as the motor 38 starts, but ratchet 48A, 48B, 48C, etc. will not rotate until a selector switch is closed.

The selector switches 59a, 59b, 59c, etc. are single pole double throw switches. In their normal positions, the switches are connected in series. When a selector switch, let us say 59b, is pressed, it completes the circuit from line 103, through normally closed contacts 107, 106, 105, etc. in series as described above, by means of lines 108, 109, 110, and 111, through the preceding selector switch 59a, through switch 59b, line 112, normally closed contacts of empty switch 31B, line 114, selector solenoid 51B, line 115 to power line L. This energizes the solenoid select relay 51B, and as a consequence the armature 53B bears down on pawl 45B, and the reciprocating action of the pawl rotates the spool 48B. Also this energizing of select relay 50B closes normally opened contacts 106c, 106d, which bypasses the selector switch 59b circuit by making a direct circuit from line 103, through the contacts 106c, 106d, solenoid 51B, line 115 and any further action of selector switch 59b is ineffective. Also this energizing of select relay 50B opens normally closed contacts 106a, 106b which had connected all selector switches to line and this action makes all selector switches 59a, 59b, 59c in this series ineffective and prevents the selection of more than one item with one coin.

This condition continues until the item is dispensed; and at that moment when the article strikes lip 29B of stop switch 30B this normally closed switch opens. This action opens the circuit of the return relay 99 that had been normally energized through power line H, line 116, through all the limit switches 31A, 31B, 31C, etc., corresponding to the switch 31A referred to above, in series, through the stop switch 56 in the chute through line 117, through return relay 99, and to power line L. This deenergizing of return relay 99 opens contacts 99a, 99b thereby breaking the circuit of start relay 82 and deenergizing it. The deenergizing of start relay 82 opens contacts 88a, 88b opening the circuit which contains the motor 38, counter and select relays and as a consequence the reciprocating action of the pawl stops. The pawl is brought to its normal initial position by the action of spring 55B, and the select relay and switches return to normal position. This action returns the dispenser to its starting position ready to receive a coin and make another selection.

There is a coin return solenoid 89 in the dispenser that is used to prevent the coin from dropping into the chute 80 when the machine is in process of dispensing an article or when all of the trays in that one series are empty. The coin return solenoid 89 when deenergized provides an obstruction by virtue of the shape of the armature 118 placed in the path of the coin before it reaches the chute 80, diverting the coin into the return cup. The coin return solenoid 89 when energized draws the armature 118 away from the coin path thus removing the obstruction. The coin return solenoid is energized when the start relay 82 is deenergized and when at the same time the return relay 99 is energized. When either the start relay 82 is energized or return relay 99 is deenergized, the coin return solenoid 89 is deenergized returning all further coins into the coin return box.

The return relay 99 is used to stop the mechanism when the article has just been dispensed, to return a coin if an article is in the process of being dispensed, or if all of the trays in that series are empty. The return relay is normally energized, but when any one of the above three conditions is met, the return relay becomes deenergized and accomplishes its assigned functions in a manner previously described.

As previously seen, the return relay is energized from line 116 through all empty switches in parallel and all stop switches in series through return relay 99, line 115 and power line L. If all of the empty switches 31A, 31B, etc. are open, or if one of the stop switches 30A, 30B, etc. is open, return relay is deenergized, thereby returning the coin to the coin return cup, as a consequence of the coin return solenoid deenergizing.

The method of interlocking the selector switches 59a, 59b, 59c, etc. with select relays 50A, 50B, 50C, etc., prevents more than one article from being dispensed with one coin. The interlocking of each selector switch such as 59b with its empty switch 31B prevents any action from occurring if the selector switch corresponding to an empty tray is depressed.

The device described above is susceptible to considerable modification in certain of its details, for example, in the type of dispensing chute in the bottom of the cabinet, the clutching mechanism whereby the motor 38 may be selectively clutched to the pusher members 18 and in the retaining elements for preventing the packages from being shaken from their supporting troughs.

Referring now to Figures 16 and 17, one form of dispensing chute is illustrated therein that is so constructed that the packages cannot be removed from the machine by reaching through the chute. In this form of chute 14, a relatively narrow central opening 125 is provided which is of such dimensions to permit the packages in the device to be dispensed. The chute is provided with a concave bottom plate 125 which is so curved as to direct the articles outwardly through the opening 125 against an upturned lip 126 on the plate. From the inner end of the plate 125 extends a reversely directed plate 127 having a downwardly and rearwardly projecting lip 128 thereon which is disposed below the lowermost row of articles in the device. In order to form a tortuous passage through which the article is passed, another generally V-shaped plate assembly 129 is provided which follows generally the contours of the plates 125 and 127, thereby forming a generally right angularly arranged discharge passage through which the packages must fall rearwardly and then forwardly to the opening 125.

Inasmuch as the opening 125 is narrower than the width of the casing, curved side plates 130 and 131 are provided which direct the packages from the outermost rows toward the center of the chute. The arrangement of the baffles or deflecting plates and the size of the opening 125 are such that it is impossible to reach through the opening 125 to gain access to the packages in the dispensing device.

As a further safeguard to the discharge of packages by shaking the machine, the device may be provided with connected resilient retaining elements 135, 136, as shown in Figures 18 to 21. The retaining elements 135 and 136 are resilient wire portions having loop-like ends 135a and 136a which engage the lower corners of the packages and are supported at the corners of the package-receiving troughs. In this form of the device, the troughs may be closely adjacent to each other, being separated by a wall or partition 137 to which are secured the angle irons 138 and 139 forming the supports for the corners of the packages. The wire 135, which is typical, has an elongated shank portion 135b which terminates in a U-shaped portion 135c connecting the elements 135 and 136 and straddling a projection 140 on a retainer assembly, best shown in Figure 18. This retainer assembly consists of a first plate 141 (Figure 20) which has three projecting elements 140, 142, and 143 thereon between which are received the loop-like portions 144 and 145 on a complementary retaining plate 146. These elements 141 and 146 are clamped on the partition member 137 by means of a bolt and the retaining wire elements 135 and 136 are slipped through the loops 144, 145 and their end passed over the projection 140 to retain them against rotation.

In this arrangement, therefore, the wire loops 135a and 136a are normally disposed in the path of the packages supported by the channel members 138 and 139. The wire loops 135a and 136a are sufficiently strong to prevent the packages from being shaken past the loops but are sufficiently resilient to permit the packages to be pushed by them when the pusher member is actuated by the motor.

Figure 22:
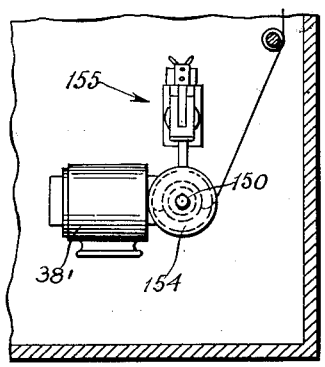
Figure 22 is an end view of a modified form of driving mechanism for the device.
Figure 23:
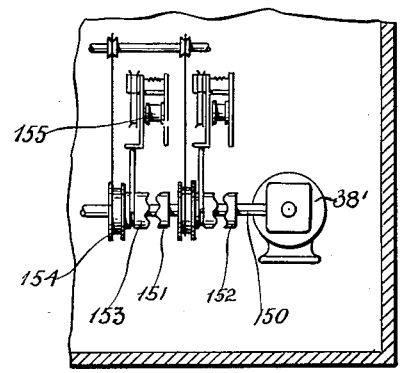
Figure 23 is a view in side elevation of the driving mechanism disclosed in Figure 23.

While the pawl and ratchet drive for the pusher members is preferred for reasons of simplicity, other types of mechanisms for coupling the motor 38 to the pushers 18 may be used if desired. As shown in Figures 22 and 23, the motor 38' may drive a drive shaft 150 which is provided with a plurality of positive clutch elements 151, 152, etc. Cooperating with the clutch element 151 for example, is a second clutch element 153 which is rotatably supported on the shaft 150 and is fixed to the spool 154. The clutch element 153 may be shifted into and out of engagement with the clutch element 151 by means of a relay 155 like the relay 50A described above so that when the coil of the relay 155 is energized, the reel 154 is clutched to the shaft 150 and will rotate therewith. When the coil of the relay 155 is deenergized, the reel 154 will be unclutched from the shaft 150 to discontinue the operation of the pusher member.

Other forms of clutching or coupling elements may be provided if desired so long as these clutches may be selectively operated to cause the rotation of a desired reel under the control of the selector switches.

Figure 24:
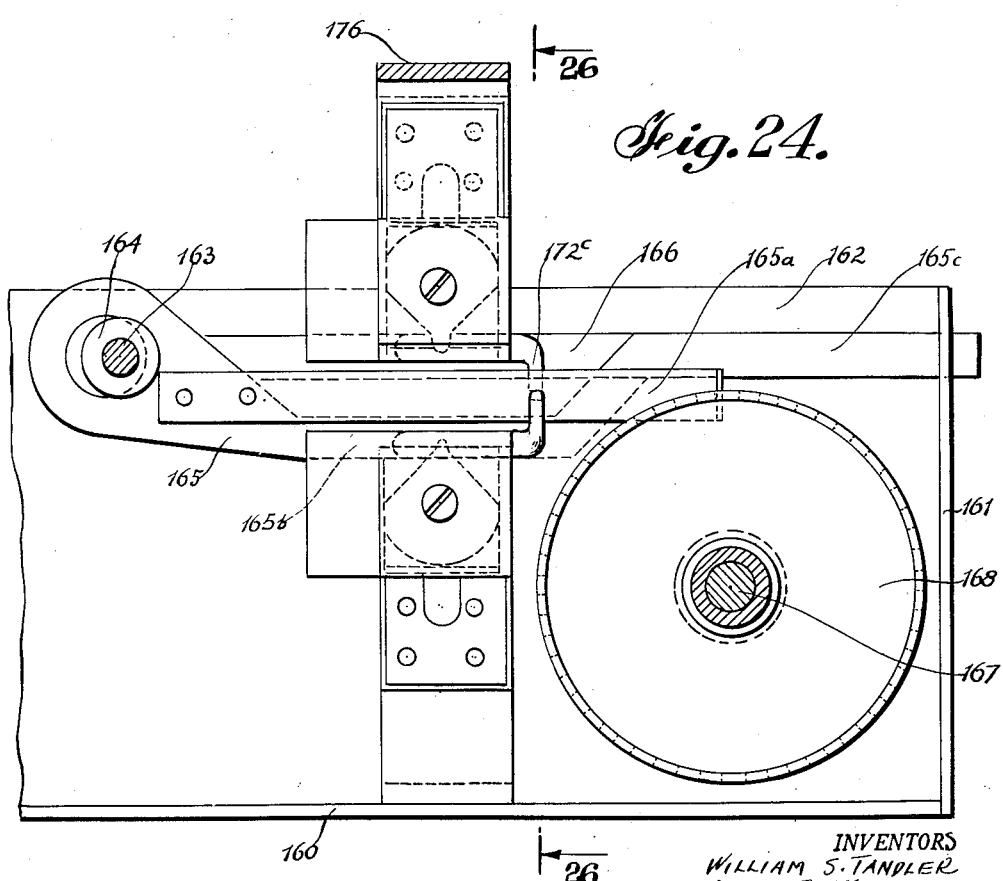
Figure 24 is a view in side elevation of a modified form of driving mechanism for the dispensing device.
Figure 25:
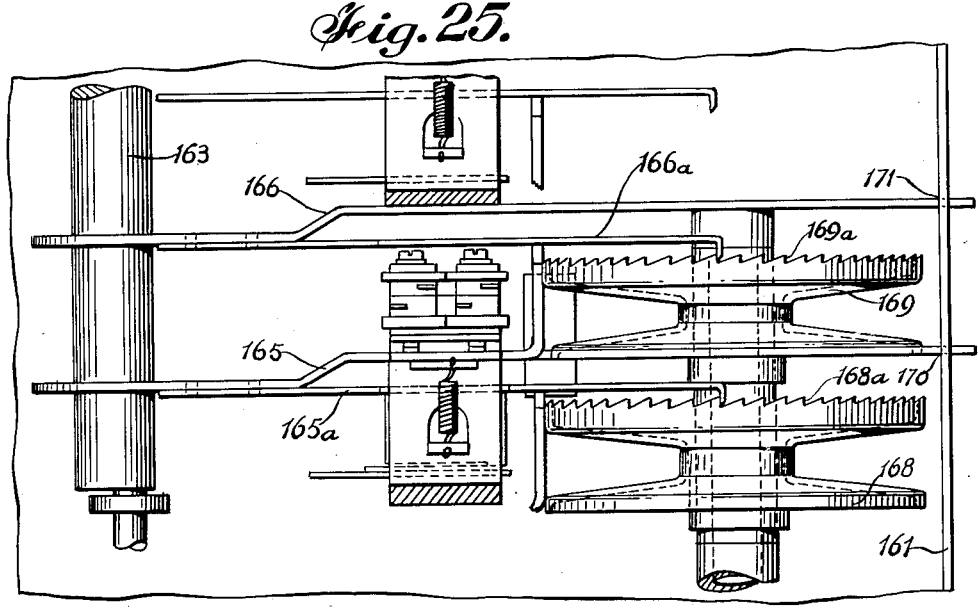
Figure 25 is a plan view of the device disclosed in Figure 24.
Figure 26:
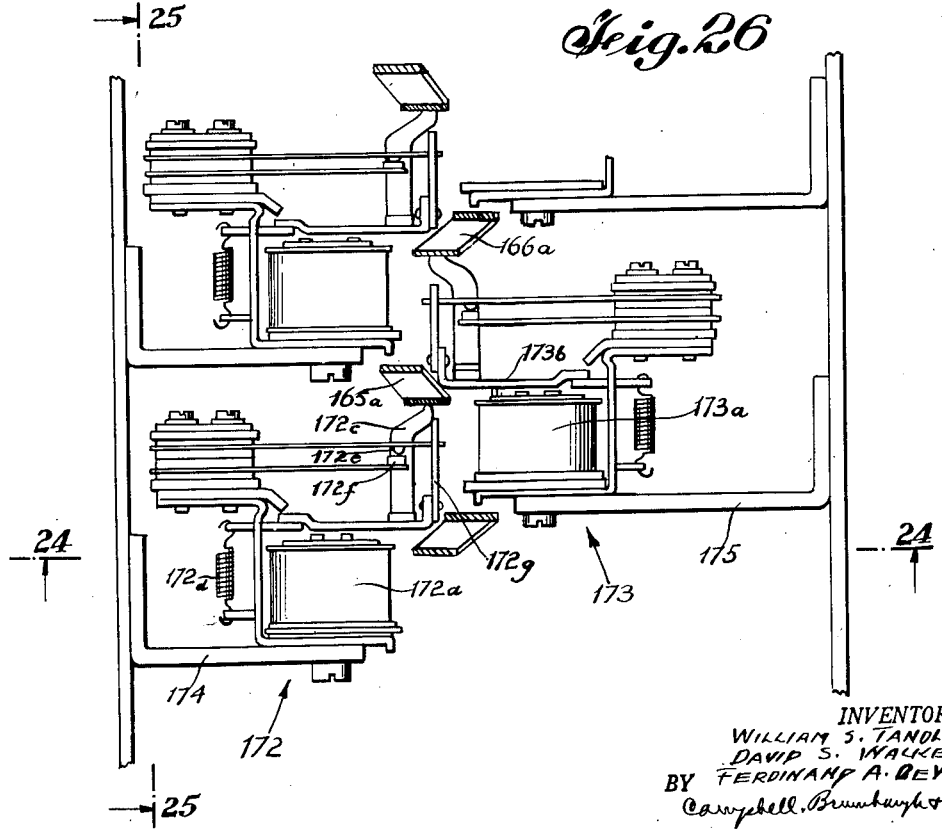
Figure 26 is a view in section taken on line 26—26 of Figure 24.

Another form of driving mechanism which has certain advantages over the form of drive mechanism disclosed in Figures 7 and 8 is disclosed in Figures 24 to 26 inclusive. In this form of device, a resilient pawl member is used which is deflected horizontally into engagement with the ratchet member. Such horizontal engagement between the pawl and ratchet overcomes any tendency for the pawl to be urged into engagement with the ratchet due to friction between the eccentric and the pawl. Referring now to Figures 24 to 26, the drive mechanism disclosed therein may include a base plate 160 adapted to be disposed in the compartment 15 of the dispensing device. The base plate 160 has upstanding flanges at one end and at both sides, only the end flange 161 and one side flange 162 being shown. The side flanges carry the cam shaft 163 which is provided with a plurality of eccentrics 164 for driving the pawl members 165, 166 etc., to be described hereinafter.

The side plates also carry the shaft 167 upon which are rotatably mounted the reels 168, 169, etc. The reels 168 and 169 are provided with ratchet teeth 168a and 169a on their lateral edges for cooperation with a resilient pawl member 165a and 166a, respectively, of the pawls 165 and 166.

As best shown in Figure 24, the pawl member 165 has a dropped and laterally bent center portion 165b and a straight end portion 165c extending substantially radially of the cam shaft 163. The straight end portion 165 is guided in a slot 170 in the end plate 161. The resilient pawl portion 165a is fixed to the pawl member 165 adjacent to the eccentric 164 and extends parallel to and offset from the portion 165c in such a position that it normally tends to engage with the ratchet teeth 168a.

The pawl member 166 consists of a substantially straight bar which is offset laterally and has its outer end guided in a slot 171 in the end plate 161. The resilient pawl member 166a is fixed to the inner end of the pawl member 166 and extends parallel therewith in such a position as to normally tend to engage the ratchet teeth 169a.

The resilient pawl members 165a and 166a, as well as other similar alternate pawl members, are normally retained out of engagement with their respective ratchet members by means of the relays 172 and 173, best shown in Figure 26. The relays 172 and 173 and other similar relays are mounted on the brackets 174 and 175 which project inwardly in staggered relationship from the upper and lower portions of a generally rectangular frame member 176 which is fixed to the base plate 160. Each of the relay members 172, 173, etc. include coils 172a, 173a, etc. which cooperate with their armatures 172b, 173b, etc. The armature 172b is provided with an offset arm 172c connected to and projecting from a lateral edge of the armature 172b and engaging the near side of the pawl member 165a. The spring 172d which urges the armature away from the coil 172a is stronger than the pawl member 165a and, therefore, normally retains the pawl member 165a out of engagement with the ratchet teeth 168a. The relay 172, as illustrated, includes a switch member having two contacts 172e and 172f. It will be understood that the relay may have two or more contacts like the relays 50A, 50B, etc. in order to complete the circuit. Each of the other relays 173, etc. are constructed similarly and are mounted in such staggered relationship to their respective pawls as to normally retain the pawls out of engagement with the corresponding ratchet teeth. The contacts 172e and 172f of the relay 172 may be closed by means of an arm 172g carried on the end of the armature and engaging the blade carrying the contact 172e.

Thus, when the eccentric shaft 163 is driven, the pawl members 165 and 166, etc. are reciprocated and the resilient pawl members 165a and 166a are not in engagement with their respective ratchets. If, for example, the relay 172 is energized by closing a selector switch, the armature 172b is drawn toward the coil 172a thereby permitting the resilient pawl member 165a to spring into engagement with the ratchet member 168a and rotate the reel 168. At the same time, the contacts 172e and 172f are engaged.

The above described drive mechanism is so arranged that any friction between the cam member 165 and the eccentric 164 which would normally tend to rotate the pawl member 165 does not have any effect upon engagement of the resilient pawl member 165a with the ratchet teeth 168a and, therefore, reduces the possibility of inadvertent dispensing of packages.

As another safeguard to the operation of the machine, a different type of coin-controlled switch may be provided which prevents the continued dispensing of articles from the machine if the switch in the coin chute should become jammed.

As shown in Figure 27, the coin chute 180 may be provided with a switch 181. Power is supplied from the power lines H' and L', the power line H' being connected by means of a conductor 182 to one side of the coil 183a of a relay 183. The other side of the coil 183a is connected by means of a conductor 184 to one contact 181a of the switch 181 which normally engages the movable contact 181b which, in turn, is connected by means of conductors 186 and 187 to the power line L' and to one side of the drive motor 38'.

The relay coil 183a is also connected by means of a conductor 188 to one contact 183b of the relay 183 which is adjacent to the normally spaced contact 183c. This latter contact is connected by means of a conductor 189 and the conductor 187 to the line L' and the motor 38'. The relay 183 also has another movable contact 183d which is connected to the power line H' by means of a conductor 190. The opposed spaced contact 183e is connected by means of conductor 191 to the coil 192a of the relay 192, through the relay coil and by means of a conductor 193 to the contact 181c of relay 181 which normally is spaced from the contact 181b. The contact 181c is also connected by means of a conductor 194 to contact 192b which cooperates with the spaced contact 192c that is connected by conductor 195 to conductor 187.

The conductor 191 is connected by means of a conductor 196 to the shiftable relay contact 192d which cooperates with the spaced contact 192e which is connected by means of the conductor 197 to the opposite side of the motor 38'. There is normally a complete circuit through the relay coil 183a from the power line H' (conductor 182, relay coil 183a, conductor 184, contact 181a, contact 181b, conductor 186, conductor 187) to power line L'. Inasmuch as the relay coil 183a is energized, the contacts 183b and 183c engage and the contacts 183e and 183d engage and remain in engagement for the reason that a holding circuit is created through the contacts 183b and 183c between the power lines H' and L' even if contact is broken between contacts 181a and 181b.

As the coin passes down the chute, it strikes the switch blade 199 of the switch 181, thereby momentarily disengaging the contacts 181a and 181b and engaging the contacts 181b and 181c. As a result, a holding circuit is established through the relay coil 192a from the power line H' through conductor 190, relay contacts 183d and 183e, conductor 191, relay coil 192a, conductor 193, contacts 181c, 181b, conductor 186, conductor 187 to power line L'. At the same time, the motor circuit is completed through the power line H', conductor 190, contact 183d, contact 183e, conductor 191, conductor 196, relay contacts 192d, 192e, and conductor 197, thereby setting the motor 138' into operation.

The above described circuit has characteristics which prevent the operation of the motor if the switches do not operate properly. Thus, for example, if the switch 181 becomes defective and remains in its closed position, the contacts 181a and 181b are disengaged. Relay 183, as well as 192, will become deenergized as soon as the line H' is opened momentarily. Relay 183 cannot be reenergized unless contact is made between 181a and 181b, i. e., the "open" position of switch 182. Relay 192 cannot be energized unless relay 183 is also energized.

The above described coin control mechanism can be substituted for the coin-controlled switch of the circuit disclosed in Figure 15 with only slight modification of the connections and the contacts thereof.

In view of the preceding description, it will be understood that a vending machine has been provided which is substantially foolproof in operation and cannot be successfully tampered with to cause the dispensing of articles without payment therefor. It will be understood further that the device is susceptible to considerable modification in appearance, capacity, and the operating elements thereof and, therefore, the forms of the invention described above should be considered as illustrative and not as limiting the scope of the following claims.

We claim:

1. An article-dispensing device having a plurality of means for supporting separate rows of articles, a separate pusher member movable along each of said supporting means for advancing said rows, a shaft, a plurality of reels each corresponding to one of said pusher members, rotatably mounted on said shaft, a flexible member connecting each of said reels to its corresponding pusher member, a second shaft parallel with said first shaft having a plurality of eccentrics thereon, each eccentric corresponding to one of said reels, a pawl member mounted on each eccentric to one side of a corresponding reel, ratchet means on said one side of each reel for engagement by a pawl on a corresponding eccentric, means normally maintaining said pawls out of engagement with said ratchets, and means for moving each pawl selectively and laterally into engagement with its corresponding ratchet.

2. A driving mechanism for an article-dispensing device comprising a first shaft, a plurality of reels rotatably mounted on said shaft, a motor, a second shaft parallel with said first shaft, driven by said motor, a plurality of eccentric cams on said second shaft, each cam corresponding to one of said reels, a pawl member supported on each cam for gyration thereby and having a laterally projecting tooth normally spaced from one side of a corresponding reel, a ratchet on said one side of each of said reels engageable by the corresponding pawl, means normally retaining said pawls out of engagement with said ratchets, and electrically actuated means for moving said pawls selectively into engagement with said ratchets.

3. An article-dispensing device comprising a casing, a plurality of means in said casing for supporting rows of articles, a chute in said casing, means for advancing each row along its supporting means to dislodge the first article in each row from the supporting means into said chute, a front panel in said casing in front of said supporting means, said panel comprising a plurality of transparent sashes in horizontal edge to edge relation, means supporting said sashes for pivotal movement about horizontal axes, hollow bars overlying the adjacent edges of said sashes, a plurality of switches mounted in said hollow bars, each switch corresponding to and disposed in front of one of said supporting means, and means electrically connecting said switches to said advancing means to actuate and advancing means when a switch corresponding thereto is actuated.

4. A dispensing device comprising an electric motor actuated by a source of electrical energy for advancing articles to be dispensed, means for receiving a coin, a double-throw coin-actuated switch adjacent to said coin-receiving means and connected to said source, said switch being movable from a first normally closed position to a second different closed position, a first relay connected to said switch having two pairs of contacts normally closed when said switch is in its first closed position, a circuit connected to said source including one pair of said contacts to energize said first relay and keep said contacts closed when said switch is in said second position, a second relay having two pairs of contacts, one of the last-mentioned pairs of contacts being connected between said motor and the other pair of contacts of said first relay, said second relay being deenergized when said switch is in said first position and energized to connect said motor to said source of electrical energy through said other pair of contacts when said switch is in said second position, a circuit including the other pair of contacts of said second relay for retaining said second relay contacts in closed position upon movement of said switch momentarily to said second position and means for disconnecting said first relay from said source to open all its contacts and thereby stop said motor.

5. An article dispensing device having a plurality of means for supporting separate rows of articles, a separate pusher member movable along each of said supporting means for advancing each row, a shaft, a plurality of reels each corresponding to one of said pusher members, said reels being rotatably mounted on said shaft, a flexible member connecting each of said reels to its corresponding pusher member to advance the latter upon rotation of each reel in one direction, a second shaft parallel with said first shaft and having a plurality of eccentrics fixed thereto, each eccentric corresponding to one of said reels, a pawl member mounted on each eccentric, means guiding each pawl member for substantially reciprocating movement adjacent to its corresponding reel, ratchet means on each reel for engagement by a pawl on a corresponding eccentric, biasing means normally maintaining said pawls out of engagement with said ratchet and electrically energized solenoid means for moving each pawl selectively into engagement with its corresponding ratchet.

6. An article dispensing device comprising a casing, a plurality of means in said casing for supporting rows of articles, a chute in said casing, means for advancing each row along its supporting means to dislodge the first article in each row from said supporting means into said chute, a front panel in said casing in front of said supporting means, said panel comprising at least one transparent sash, a plurality of vertically spaced parallel hollow bars overlying said sash, a plurality of switches mounted in said hollow bars, each switch corresponding to and disposed in front of one of said supporting means, and means electrically connecting said switches to advancing means to actuate an advancing means when a switch corresponding thereto is actuated.

WILLIAM S. TANDLER.
DAVID S. WALKER.
FERDINAND A. DE WEISS.

REFERENCES CITED

The following references are of record in the file of this patent:

UNITED STATES PATENTS

| Number | Name | Date |
| --- | --- | --- |
| 863,743 | McLouth | Aug. 20, 1907 |
| 1,319,084 | Hume | Oct. 21, 1919 |
| 1,355,488 | McKenney | Oct. 12, 1920 |
| 2,098,069 | Stewart | Nov. 2, 1937 |
| 2,223,486 | Filben | Dec. 3, 1940 |
| 2,314,632 | Rear | Mar. 23, 1943 |
| 2,315,622 | Ivie | Apr. 6, 1943 |
| 2,330,186 | Jetseck | Sept. 21, 1943 |
| 2,359,133 | Wilsey | Sept. 26, 1944 |